United States Patent
Hosoda et al.

(10) Patent No.: US 10,920,030 B2
(45) Date of Patent: *Feb. 16, 2021

(54) PREPREG, METHOD FOR ITS PRODUCTION, AND FIBER-REINFORCED MOLDED PRODUCT

(71) Applicant: AGC Inc., Chiyoda-ku (JP)

(72) Inventors: Tomoya Hosoda, Chiyoda-ku (JP); Takashi Sato, Chiyoda-ku (JP); Masatoshi Abe, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 107 days.

This patent is subject to a terminal disclaimer.

(21) Appl. No.: 15/996,966

(22) Filed: Jun. 4, 2018

(65) Prior Publication Data

US 2018/0282499 A1 Oct. 4, 2018

Related U.S. Application Data

(63) Continuation of application No. PCT/JP2017/000852, filed on Jan. 12, 2017.

(30) Foreign Application Priority Data

Jan. 13, 2016 (JP) .................................. 2016-004491
Apr. 18, 2016 (JP) .................................. 2016-082787

(51) Int. Cl.
```
C08J 5/24       (2006.01)
C08L 77/02      (2006.01)
C08L 79/08      (2006.01)
C08L 27/18      (2006.01)
C08L 71/00      (2006.01)
C08L 101/00     (2006.01)
B29B 11/16      (2006.01)
B29C 70/42      (2006.01)
B29C 70/06      (2006.01)
B29B 11/00      (2006.01)
B29K 71/00      (2006.01)
B29K 77/00      (2006.01)
B29K 79/00      (2006.01)
B29K 81/00      (2006.01)
B29K 307/04     (2006.01)
B29K 427/12     (2006.01)
```

(52) U.S. Cl.
CPC .................. *C08J 5/24* (2013.01); *B29B 11/16* (2013.01); *B29C 70/42* (2013.01); *C08L 27/18* (2013.01); *C08L 71/00* (2013.01); *C08L 77/02* (2013.01); *C08L 79/08* (2013.01); *C08L 101/00* (2013.01); *B29B 11/00* (2013.01); *B29C 70/06* (2013.01); *B29K 2071/00* (2013.01); *B29K 2077/00* (2013.01); *B29K 2079/08* (2013.01); *B29K 2081/06* (2013.01); *B29K 2307/04* (2013.01); *B29K 2313/00* (2013.01); *B29K 2427/12* (2013.01); *B29K 2995/0089* (2013.01); *C08J 2371/10* (2013.01); *C08J 2377/02* (2013.01); *C08J 2379/08* (2013.01); *C08J 2381/06* (2013.01); *C08J 2427/18* (2013.01)

(58) Field of Classification Search
CPC ............. C08J 5/24; B29B 11/16; B29C 70/42
See application file for complete search history.

(56) References Cited

U.S. PATENT DOCUMENTS

2001/0006727 A1* 7/2001 Lee .......................... C08L 27/18
                                                            428/373
2012/0149798 A1   6/2012 Saito et al.

FOREIGN PATENT DOCUMENTS

| CN | 1413272 A | 4/2003 |
|---|---|---|
| CN | 104114638 B | 2/2013 |
| JP | 2000-273321 | 10/2000 |
| JP | 2012-501407 | 1/2012 |
| JP | 2013-531717 | 8/2013 |
| TW | I458766 B | 3/2012 |
| WO | WO 2009/020182 A1 | 2/2009 |
| WO | WO 2011/021670 A1 | 2/2011 |

OTHER PUBLICATIONS

International Search Report dated Apr. 11, 2017 in PCT/JP2017/000852 filed Jan. 12, 2017 (with English Translation).
Taiwanese Office Action dated Jun. 29, 2020, Taiwanese Patent Application No. 106101196.

* cited by examiner

*Primary Examiner* — Ana L. Woodward

(74) *Attorney, Agent, or Firm* — Oblon, McClelland, Maier & Neustadt, L.L.P.

(57) ABSTRACT

To provide a prepreg excellent in storage stability and capable of obtaining a fiber-reinforced molded product excellent in impact resistance, and a method for its production, as well as a fiber-reinforced molded product excellent in impact resistance. The prepreg comprises reinforcing fibers and a matrix resin, wherein the matrix resin comprises a thermoplastic resin (but excluding the following fluororesin) and a melt-formable fluororesin having a melting point of from 100 to 325° C. and having functional groups of at least one type selected from the group consisting of carbonyl group-containing groups, hydroxy groups, epoxy groups and isocyanate groups, and in 100 mass % of the total of the thermoplastic resin and the fluororesin, the proportion of the thermoplastic resin is from more than 30 to 99 mass % and the proportion of the fluororesin is from 1 to less than 70 mass %.

7 Claims, No Drawings

PREPREG, METHOD FOR ITS PRODUCTION, AND FIBER-REINFORCED MOLDED PRODUCT

TECHNICAL FIELD

The present invention relates to a prepreg and a method for its production, a matrix resin for the prepreg, and a fiber-reinforced molded product.

BACKGROUND ART

Fiber-reinforced molded products have been employed in a wide range of applications including transport equipment (vehicles (automobiles, railway vehicles, etc.), aircrafts, etc.), building components, electronic devices, etc. As matrix resins for the fiber-reinforced molded products, cured products of thermosetting resins have been commonly employed.

However, the fiber-reinforced molded products wherein cured products of thermosetting resins are used as the matrix resins, have the following problems.

Since the cured products of the thermosetting resins are brittle, impact resistance of the fiber-reinforced molded products is insufficient.

In prepregs being precursors for fiber-reinforced molded products, thermosetting resins before curing tend to be hardened during storage of the prepregs, whereby the useful life of the prepregs is relatively short.

Therefore, a prepreg and a fiber-reinforced molded product have been proposed wherein a thermoplastic resin is employed as the matrix resin (e.g. Patent Documents 1 and 2).

PRIOR ART DOCUMENTS

Patent Documents

Patent Document 1: JP-A-2013-531717
Patent Document 2: JP-A-2012-501407

DISCLOSURE OF INVENTION

Technical Problem

However, the conventional fiber-reinforced molded product wherein a thermoplastic resin is employed as the matrix resin, cannot necessarily be said to be sufficient in impact resistance, and further improvement in impact resistance is required.

The present invention is to provide a prepreg excellent in storage stability and capable of obtaining a fiber-reinforced molded product excellent in impact resistance and a method for its production, as well as a fiber-reinforced molded product excellent in impact resistance.

Solution to Problem

The present invention has the following embodiments.
<1> A prepreg comprising reinforcing fibers and a matrix resin, wherein the matrix resin comprises a thermoplastic resin (but excluding the following fluororesin) and a melt-moldable fluororesin having functional groups of at least one type selected from the group consisting of carbonyl group-containing groups, hydroxy groups, epoxy groups and isocyanate groups, and in 100 mass % of the total of the thermoplastic resin and the fluororesin, the proportion of the thermoplastic resin is from more than 30 to 99 mass % and the proportion of the fluororesin is from 1 to less than 70 mass %.
<2> A prepreg comprising reinforcing fibers and a matrix resin, wherein the matrix resin comprises a thermoplastic resin (but excluding the following fluororesin) and a melt-moldable fluororesin having a melting point of from 100 to 325° C. and having functional groups of at least one type selected from the group consisting of carbonyl group-containing groups, hydroxy groups, epoxy groups and isocyanate groups, and in 100 mass % of the total of the thermoplastic resin and the fluororesin, the proportion of the thermoplastic resin is from more than 30 to 99 mass %, and the proportion of the fluororesin is from 1 to less than 70 mass %.
<3> The prepreg according to <2>, wherein the matrix resin has a sea-island structure composed of a sea portion containing the thermoplastic resin and island portions containing the fluororesin, wherein the average diameter of the island portions is from 0.01 to 200 μm.
<4> The prepreg according to <2> or <3>, wherein the melting point of the fluororesin is from 100 to less than 260° C.
<5> A prepreg comprising reinforcing fibers and a matrix resin, wherein the matrix resin has an Izod impact strength measured at −40° C. of at least 60 J/m.
<6> A matrix resin for a prepreg, which comprises a thermoplastic resin (but excluding the following fluororesin) and a melt-moldable fluororesin having a melting point of from 100 to 325° C. and having functional groups of at least one type selected from the group consisting of carbonyl group-containing groups, hydroxy groups, epoxy groups and isocyanate groups, wherein in 100 mass % of the total of the thermoplastic resin and the fluororesin, the proportion of the thermoplastic resin is from more than 30 to 99 mass % and the proportion of the fluororesin is from 1 to less than 70 mass %.
<7> A method for producing a prepreg, wherein a powder mixture obtained by mixing a powder (X) made of a resin material (a) containing a thermoplastic resin (but excluding the following fluororesin) and a powder (Y) made of a resin material (β) containing a melt-moldable fluororesin having a melting point of from 100 to 325° C. and having functional groups of at least one type selected from the group consisting of carbonyl group-containing groups, hydroxy groups, epoxy groups and isocyanate groups, so that in 100 mass % of the total of the thermoplastic resin and the fluororesin, the proportion of the thermoplastic resin becomes from more than 30 to 99 mass % and the proportion of the fluororesin becomes from 1 to less than 70 mass %, is melted in the presence of a reinforcing fiber sheet, to let the resin material (a) and the resin material (β) be impregnated into the reinforcing fiber sheet.
<8> The method for producing a prepreg according to <7>, wherein the average particle diameter of the powder (X) is from 0.02 to 200 μm, and the average particle diameter of the powder (Y) is from 0.02 to 200 μm.
<9> A method for producing a prepreg, wherein a powder (Z) made of a resin material (γ) containing a thermoplastic resin (but excluding the following fluororesin) and a melt-moldable fluororesin having a melting point of from 100 to 325° C. and having functional groups of at least one type selected from the group consisting of carbonyl group-containing groups, hydroxy groups, epoxy groups and isocyanate groups, so that in 100 mass % of the total of the thermoplastic resin and the fluororesin, the proportion of the thermoplastic resin is from more than 30 to 99 mass % and the proportion of the fluororesin is from 1 to less than 70 mass %, is melted in the presence of a reinforcing fiber sheet, to let the resin material (γ) be impregnated into the reinforcing fiber sheet.

<10> The method for producing a prepreg according to <9>, wherein the average particle diameter of the powder (Z) is from 0.02 to 200 μm, and the average diameter of island portions containing the fluororesin in the resin material (γ) prior to being impregnated into the reinforcing fiber sheet, is from 0.01 to 8 μm and less than the average particle diameter of the powder (Z).

<11> A method for producing a prepreg, wherein a resin film made of a resin material (γ) containing a thermoplastic resin (but excluding the following fluororesin) and a melt-moldable fluororesin having a melting point of from 100 to 325° C. and having functional groups of at least one type selected from the group consisting of carbonyl group-containing groups, hydroxy groups, epoxy groups and isocyanate groups, so that in 100 mass % of the total of the thermoplastic resin and the fluororesin, the proportion of the thermoplastic resin is from more than 30 to 99 mass % and the proportion of the fluororesin is from 1 to less than 70 mass %, is melted in the presence of a reinforcing fiber sheet, to let the resin material (γ) be impregnated into the reinforcing fiber sheet.

<12> The method for producing a prepreg according to <11>, wherein the average diameter of island portions containing the fluororesin in the resin material (γ) prior to being impregnated to the reinforcing fiber sheet is from 0.01 to 8 μm and less than the thickness of the resin film.

<13> A fiber-reinforced molded product using the prepreg as defined in <1> or <5>.

<14> A fiber-reinforced molded product using the prepreg as defined in any one of <2> to <4>.

Advantageous Effects of Invention

According to the prepreg of the present invention, it is possible to obtain a fiber-reinforced molded product excellent in impact resistance. Further, the prepreg of the present invention is excellent in storage stability. The matrix resin for a prepreg of the present invention is suitable as a matrix resin to be used in the prepreg of the present invention. According to the method for producing a prepreg of the present invention, it is possible to produce a prepreg excellent in storage stability and capable of obtaining a fiber-reinforced molded product excellent in impact resistance. The fiber-reinforced molded product of the present invention is excellent in impact resistance.

DESCRIPTION OF EMBODIMENTS

The following definitions of terms apply throughout the specification including claims.

The "melting point" is the temperature corresponding to the maximum value of the melting peak as measured by a differential scanning calorimetry (DSC) method.

Being "melt-moldable" means to show a melt flowability. "Showing a melt flowability" means that a temperature at which the melt flow rate becomes to be from 0.1 to 1,000 g/10 min. is present under a load of 49N at a temperature higher by at least 20° C. than the melting point of the resin.

The "melt flow rate" is a melt mass flow rate (MFR) as specified in JIS K7210; 1999 (ISO 1133; 1997).

A "unit" refers to a moiety (polymerized unit) derived from a monomer, i.e. formed by polymerization of the monomer. A unit may be a unit formed directly by a polymerization reaction, or a unit having a part of the unit converted to another structure by treating the polymer.

The "average diameter of island portions" is one obtained by measuring the areas with respect to five island portions in an electron microscope image of a resin material or a matrix resin, and calculating the equivalent circle diameters from the areas, followed by averaging them.

The "average particle diameter of a powder" is a volume-based cumulative 50% diameter (D50) determined by a laser diffraction scattering method. That is, the particle size distribution is measured by a laser diffraction scattering method, to obtain a cumulative curve based on the total volume of the population of particles being 100%, whereby it is the particle diameter at the point where the cumulative volume becomes 50% on the cumulative curve.

<Prepreg>

The prepreg of the present invention comprises reinforcing fibers and a matrix resin. Specifically, it is a sheet-form material having a matrix resin impregnated to reinforcing fibers, and it is also referred to as a sheet-form material having reinforcing fibers embedded in a matrix resin. Here, it includes, not only one completely impregnated, but also one so-called semi-preg obtained by letting a matrix resin powder be adhered to the surface of reinforcing fibers and melted to let it be semi-impregnated into the reinforcing fibers.

(Reinforcing Fibers)

As the reinforcing fibers, from the viewpoint of mechanical properties of fiber-reinforced molded products, continuous long fibers with a length of at least 10 mm are preferred. The reinforcing fibers need not be continuous over the entire length in the longitudinal direction or over the entire width in the width direction of the reinforcing fibers and may be divided in the middle.

As the processed form of reinforcing fibers, from the viewpoint of mechanical properties of fiber-reinforced molded products, one processed into a sheet (hereinafter referred to as a reinforcing fiber sheet) is preferred.

The reinforcing fiber sheet may, for example, be a reinforcing fiber bundle composed of a plurality of reinforcing fibers, a cloth made by weaving such reinforcing fiber bundles, a unidirectional reinforcing fiber bundle having a plurality of reinforcing fibers drawn and aligned in one direction, a unidirectional cloth composed of such unidirectional reinforcing fiber bundles, a combination thereof, or one having a plurality of reinforcing fiber bundles laminated.

The reinforcing fibers may be inorganic fibers, metal fibers, organic fibers, etc.

The inorganic fibers may be carbon fibers, graphite fibers, glass fibers, silicon carbide fibers, silicon nitride fibers, alumina fibers, silicon carbide fibers, boron fibers, etc.

The metal fibers may be aluminum fibers, brass fibers, stainless steel fibers, etc.

The organic fibers may be aromatic polyamide fibers, polyaramide fibers, polyparaphenylene benzoxazole (PBO) fibers, polyphenylene sulfide fibers, polyester fibers, acrylic fibers, nylon fibers, polyethylene fibers, etc.

The reinforcing fibers may be those having surface treatment applied. As the reinforcing fibers, one type may be used alone, or two or more types may be used in combination. As the reinforcing fibers, carbon fibers are preferred, since they have a small specific gravity, a high strength and a high modulus.

As the carbon fibers, for example, those described in WO2013/129169 may be mentioned, and particularly, those described in paragraphs 0018 to 0026 are preferred. Further, as the production methods for the carbon fibers, those described in paragraphs from 0028 to 0033 may be mentioned.

(Matrix Resin)

The matrix resin comprises the thermoplastic resin (A) (but excluding the fluororesin (B)) and the fluororesin (B).

The matrix resin may contain components other than the thermoplastic resin (A) and the fluororesin (B) within a range not to impair the effects of the present invention.

Details of the thermoplastic resin (A) and the fluororesin (B), suitable proportions, etc. of the respective components to be used in the matrix resin in the present invention, are the same as in the description of the prepreg to be described later.

Sea-Island Structure:

From the viewpoint of the impact resistance of the fiber-reinforced molded product, the matrix resin preferably has a sea-island structure composed of a sea portion containing the thermoplastic resin (A), and island portions containing the fluororesin (B).

The average diameter of island portions is preferably from 0.01 to 200 μm, more preferably from 0.01 to 100 μm. When the average diameter is at least the lower limit value in the above range, the fiber-reinforced molded product will be remarkably excellent in impact resistance. When the average diameter is at most the upper limit value in the above range, the impact resistance of the fiber-reinforced molded article will be excellent. If it exceeds the upper limit value, there may be a case where the impact resistance of the fiber-reinforced molded product will not be sufficient.

The thermoplastic resin (A) may be a crystalline resin, an amorphous resin, a thermoplastic elastomer, etc. (but excluding the fluororesin (B)).

The crystalline resin may be a polyester resin (polyethylene terephthalate, polybutylene terephthalate, polytrimethylene terephthalate, polyethylene naphthalate, liquid crystal polyester, etc.), a polyolefin resin (polyethylene, polypropylene, polybutylene, acid-modified polyethylene, acid-modified polypropylene, acid-modified polybutylene, etc.), polyoxymethylene, polyamide, a polyarylene sulfide resin (polyphenylene sulfide, etc.), polyketone, polyether ketone, polyether ether ketone, polyether ketone ketone, polyether nitrile, a fluororesin (polytetrafluoroethylene, etc.) other than the fluororesin (B), a liquid crystal polymer, etc.

The amorphous resin may be a styrene resin (polystyrene, acrylonitrile-styrene resin, acrylonitrile butadiene styrene resin, etc.), polycarbonate, polymethyl methacrylate, polyvinyl chloride, unmodified or modified polyphenylene ether, thermoplastic polyimide, polyamideimide, polyetherimide, polysulfone, polyether sulfone, polyarylate, etc.

The thermoplastic elastomer may be a polystyrene-type elastomer, a polyolefin-type elastomer, a polyurethane-type elastomer, a polyester-type elastomer, a polyamide-type elastomer, a polybutadiene-type elastomer, a polyisoprene-type elastomer, a fluorinated elastomer (but excluding the same one as the fluororesin (B)), an acrylonitrile-type elastomer, etc.

Others may be a phenolic resin, a phenoxy-type resin, etc.

As the thermoplastic resin (A), from such a viewpoint that the impact resistance of the fiber-reinforced molded product will be remarkably excellent, polyamide, a polyarylene sulfide resin (polyphenylene sulfide, etc.), polyketone, polyether ketone, polyether ether ketone, polyether ketone ketone, polyether nitrile, modified polyphenylene ether, thermoplastic polyimide, polyamideimide, polyetherimide, polysulfone, polyether sulfone, polyarylate, etc. are preferred. Among them, since the impact resistance will be remarkably improved, polyamide is particularly preferred. As specific examples of the polyamide, those described in [0069] of JP-A-2003-176394 may be mentioned.

Fluororesin (B):

The fluororesin (B) is a fluororesin having functional groups of at least one type selected from the group consisting of carbonyl group-containing groups, hydroxy groups, epoxy groups and isocyanate groups (hereinafter referred to as functional groups (f)). It is considered that by having functional groups (f), the thermoplastic resin (A) and the functional groups (f) will undergo a reaction or association, whereby the fiber-reinforced molded product will be excellent in impact resistance. Particularly, by the reaction or association of the functional groups (f) and polar groups present in the main chain and/or at terminals of the thermoplastic resin (A), it is possible to impart toughness of the fluororesin (B) to the thermoplastic resin (A), and thus, the fiber-reinforced molded product will be excellent in impact resistance.

The functional groups (f) are, from the viewpoint of excellent impact resistance of fiber-reinforced molded product, preferably present as either one or both of the main chain terminal groups and the main chain pendant groups of the fluororesin (B). The functional groups (f) may be of one type, or may be of two or more types.

The fluororesin (B) preferably has at least carbonyl group-containing groups as the functional groups (f), from the viewpoint of the impact resistance of the fiber-reinforced molded product.

A carbonyl group-containing group may, for example, be a group having a carbonyl group between carbon atoms of a hydrocarbon group, a carbonate group, a carboxy group, a haloformyl group, an alkoxycarbonyl group, an acid anhydride group, etc.

In the group having a carbonyl group between carbon atoms of a hydrocarbon group, the hydrocarbon group may, for example, be an alkylene group having from 2 to 8 carbon atoms. Here, the number of carbon atoms in the alkylene group is the number of carbon atoms in the state not including carbon atoms constituting the carbonyl group. The alkylene group may be linear or may be branched.

The haloformyl group is represented by —C(=O)—X (wherein X is a halogen atom). As the halogen atom in the haloformyl group, a fluorine atom, a chlorine atom, etc. may be mentioned, and a fluorine atom is preferred. That is, as the haloformyl group, a fluoroformyl group (referred to also as a carbonyl fluoride group) is preferred.

The alkoxy group in the alkoxycarbonyl group may be linear or may be branched, and it is preferably an alkoxy group having from 1 to 8 carbon atoms, particularly preferably a methoxy group or an ethoxy group.

The content of functional groups (f) in the fluororesin (B) is preferably from 10 to 60,000 groups, more preferably from 100 to 50,000 groups, further preferably from 100 to 10,000 groups, particularly preferably from 300 to 5,000 groups, to $1 \times 10^6$ carbon atoms in the main chain of the fluororesin (B). When the content is at least the lower limit value in the above range, the impact resistance of the fiber-reinforced molded product will be remarkably excellent. When the content is at most the upper limit value in the above range, even if the temperature at the time of molding the prepreg is made low, the impact resistance of the fiber-reinforced molded product will be excellent.

The content of functional groups (f) can be measured by a method such as a nuclear magnetic resonance (NMR) analysis, an infrared absorption spectrum analysis, etc. For example, using a method such as an infrared absorption spectrum analysis as described in JP-A-2007-314720, the proportion (mol %) of units having functional groups (f) in all units constituting the fluororesin (B) is obtained, and from the proportion, the content of functional groups (f) can be calculated.

The melting point of the fluororesin (B) is from 100 to 325° C., preferably from 100 to less than 260° C., more preferably from 120 to 220° C. When the melting point is at least the lower limit value in the above range, heat resistance of the fiber-reinforced molded product will be excellent. When the melting point is at most the upper limit value in the above range, it is possible to use a common device at the time of producing the fiber-reinforced molded product, and impact resistance of the fiber-reinforced molded product will be excellent.

In a case where a fluororesin (B) having a relatively low melting point is employed, even if the temperature at the time of molding the prepreg is made to be low, the impact resistance of the fiber-reinforced molded product will be excellent. Thus, in such a case, the melting point of the fluororesin (B) is preferably from 120 to 220° C., more preferably from 120 to 200° C.

It is preferred to use a fluororesin (B) having a relatively high melting point, since a fiber-reinforced molded product having high heat resistance can thereby be obtained. Thus, in such a case, the melting point of the fluororesin (B) is preferably from 260 to 320° C., more preferably from 280 to 320° C.

The melting point of the fluororesin (B) may be adjusted by the types or proportions of the units constituting the fluororesin (B), the molecular weight of the fluororesin (B), etc. For example, there is a tendency that the melting point rises, as the proportion of the units (u1) to be described later, becomes large.

The fluororesin (B) is preferably one having a melting point as described above, but may be a fluorinated elastomer having no melting point.

The fluorinated elastomer is preferably an elastomer containing structural units based on at least one monomer selected from the group consisting of tetrafluoroethylene, hexafluoropropylene, vinylidene fluoride and chlorotrifluoroethylene. Specifically, a tetrafluoroethylene/propylene copolymer described in JP-A-05-78539; a vinylidene fluoride/hexafluoropropylene copolymer, a vinylidene fluoride/hexafluoropropylene/tetrafluoroethylene copolymer, etc. described in JP-A-11-124482; a fluorinated polymer having repeating units based on tetrafluoroethylene and repeating units based on perfluoro(methyl vinyl ether) described in JP-A-2006-089720; etc., may be mentioned.

As the fluororesin (B), a melt-moldable one is used from such a viewpoint that it is thereby easy to produce a powder, a resin film and a prepreg.

The melt-moldable fluororesin (B) may be a fluororesin having functional groups (f) introduced to a known melt-moldable fluororesin (such as a tetrafluoroethylene/fluoroalkyl vinyl ether copolymer, a tetrafluoroethylene/hexafluoropropylene copolymer, an ethylene/tetrafluoroethylene copolymer, polyvinylidene fluoride, polychlorotrifluoroethylene or an ethylene/chlorotrifluoroethylene copolymer), a fluorinated polymer (B11) to be described later, etc.

As the fluororesin (B), one is used whereby a temperature at which the melt flow rate becomes to be from 0.1 to 1,000 g/10 min. is present under a load of 49N at a temperature higher by at least 20° C. than the melting point of the fluororesin (B). The melt flow rate is preferably from 0.5 to 100 g/10 min., more preferably from 1 to 30 g/10 min., further preferably from 5 to 20 g/10 min. When the melt flow rate is at least the lower limit value in the above range, moldability of the fluororesin (B) will be excellent. When the melt flow rate is at most the upper limit value in the above range, mechanical properties of the fiber-reinforced molded product will be excellent.

As the fluororesin (B), due to the difference in the production method, for example, the following ones may be mentioned.

Fluororesin (B1): A fluorinated polymer having functional groups (f) derived from at least one member selected from the group consisting of a monomer, a chain transfer agent and a polymerization initiator used at the time of the production of the fluorinated polymer. Hereinafter, the fluororesin (B1) may be referred to also as the polymer (B1).

Fluororesin (B2): A fluororesin having functional groups (f) introduced to a fluororesin having no functional group (f), by surface treatment such as corona discharge treatment, plasma treatment, etc.

Fluororesin (B3): A fluororesin obtained by graft-polymerizing a monomer having a functional group (f) to a fluororesin having no functional group (f).

As the fluororesin (B), for the following reasons, the polymer (B1) is preferred.

In the polymer (B1), in either one or both of the main chain terminal groups and the main chain pendant groups of the polymer (B1), a functional group (f) is present, whereby the impact resistance of the fiber-reinforced molded product will be remarkably excellent.

Functional groups (f) in the fluororesin (B2) are unstable, because they were formed by surface treatment, and are likely to disappear as time passes.

In a case where functional groups (f) in the polymer (B1) are derived from a monomer used in the production of the polymer (B1), the polymer (B1) may be prepared by the following method (i). In such a case, the functional groups (f) are present in units derived from the monomer, which were formed by polymerization of the monomer at the time of the production.

Method (i): At the time of producing the polymer (B1) by polymerization of a monomer, a monomer having a functional group (f) is used.

In a case where functional groups (f) in the polymer (B1) are derived from a chain transfer agent used in the production of the polymer (B1), the polymer (B1) may be prepared by the following method (ii). In such a case, the functional group (f) is present as a terminal group of the main chain of the polymer (B1).

Method (ii): In the presence of a chain transfer agent having a functional group (f), the polymer (B1) is produced by polymerization of a monomer. The chain transfer agent having a functional group (f) may be acetic acid, acetic anhydride, methyl acetate, ethylene glycol, propylene glycol, etc.

In a case where functional groups (f) in the polymer (B1) are derived from a polymerization initiator used in the production of the polymer (B1), the polymer (B1) may be prepared by the following method (iii). In such a case, the functional group (f) is present as a terminal group of the main chain of the polymer (B1).

Method (iii): In the presence of a polymerization initiator such as a radical polymerization initiator having a functional group (f), the polymer (B1) is produced by polymerization of a monomer.

The radical polymerization initiator having a functional group (f) may be di-n-propyl peroxydicarbonate, diisopropyl peroxydicarbonate, tert-butylperoxy isopropyl carbonate, bis(4-tert-butylcyclohexyl) peroxydicarbonate, di-2-ethylhexyl peroxydicarbonate, etc.

In a case where functional groups (f) in the polymer (B1) are derived from at least two members among a monomer, a chain transfer agent and a polymerization initiator used in the production of the polymer (B1), it is possible to produce the polymer (B1) by combining at least two among the methods (i) to (iii).

As the polymer (B1), from such a viewpoint that the content of functional groups (f) can be easily controlled and thus, it is easy to adjust the impact resistance of the fiber-reinforced molded product, the polymer (B1) having functional groups (f) derived from a monomer, produced by the method (i), is preferred.

The monomer having a functional group (f) may be a monomer having a carboxy group (maleic acid, itaconic acid, citraconic acid, undecylenic acid, etc.); a monomer having an acid anhydride group (itaconic anhydride (hereinafter referred to also as "IAH"), citraconic anhydride (hereinafter referred to also as "CAH"), 5-norbornene-2,3-dicarboxylic anhydride (hereinafter referred to also as "NAH"), maleic anhydride, etc.), a monomer having a hydroxy group and an epoxy group (hydroxybutyl vinyl ether, glycidyl vinyl ether, etc.), etc.

As the polymer (B1) having functional groups (f) derived from a monomer, the following fluorinated polymer (B11) is particularly preferred from such a viewpoint that the impact resistance of the fiber-reinforced molded product will be remarkably excellent.

A fluorinated polymer (B11) comprising units (u1) derived from tetrafluoroethylene (hereinafter referred to also as "TFE") or chlorotrifluoroethylene (hereinafter referred to also as "CTFE"), units (u2) derived from a cyclic hydrocarbon monomer having an acid anhydride group (hereinafter referred to also as an "acid anhydride group-containing cyclic hydrocarbon monomer"), and units (u3) derived from the fluorinated monomer (but excluding TFE and CTFE). Here, acid anhydride groups in the units (u2) correspond to functional groups (f).

The acid anhydride group-containing cyclic hydrocarbon monomer constituting units (u2) may be IAH, CAH, NAH, maleic anhydride, etc. As the acid anhydride group-containing cyclic hydrocarbon monomer, one type may be used alone, or two or more types may be used in combination.

As the acid anhydride group-containing cyclic hydrocarbon monomer, preferred is at least one member selected from the group consisting of IAH, CAH and NAH, and when at least one member selected from the group consisting of IAH, CAH and NAH is used, it is possible to easily produce a fluorinated polymer (B11) without using a special polymerization method (see JP-A-11-193312) which is required when using a maleic acid anhydride.

As the acid anhydride group-containing cyclic hydrocarbon monomer, from such a viewpoint that the impact resistance of the fiber-reinforced molded product will be remarkably excellent, IAH or NAH is preferred.

As the fluorinated monomer to constitute units (u3), preferred is a fluorinated compound having one carbon-carbon double bond. For example, a fluoroolefin (vinyl fluoride, vinylidene fluoride, trifluoroethylene, hexafluoropropylene (hereinafter referred to also as "HFP"), hexafluoroisobutylene, etc., but excluding TFE), $CF_2=CFOR^{f1}$ (wherein $R^{f1}$ is a $C_{1-10}$ perfluoroalkyl group which may contain an oxygen atom between carbon atoms) (hereinafter referred to also as "PAVE"), $CF_2=CFOR^{f2}CO^2X^1$ (wherein $R^{f2}$ is a $C_{1-10}$ perfluoroalkylene group which may contain an oxygen atom between carbon atoms, and $X^1$ is a halogen atom or a hydroxy group), $CF_2=CFOR^{f3}CO_2X^2$ (wherein $R^{f3}$ is a $C_{1-10}$ perfluoroalkylene group which may contain an oxygen atom between carbon atoms, and $X^2$ is a hydrogen atom or a $C_{1-3}$ alkyl group), $CF_2=CF(CF_2)_pOCF=CF_2$ (wherein p is 1 or 2), $CH_2=CX^3(CF_2)_qX^4$ (wherein $X^3$ is a hydrogen atom or a fluorine atom, q is an integer of from 2 to 10, and $X^4$ is a hydrogen atom or a fluorine atom) (hereinafter referred to also as "FAE"), a fluorinated monomer having a ring structure (perfluoro(2,2-dimethyl-1,3-dioxole), 2,2,4-trifluoro-5-trifluoromethoxy-1,3-dioxole, perfluoro(2-methylene-4-methyl-1,3-dioxolane), etc.), etc. may be mentioned.

As the fluorinated monomer, from such a viewpoint that the moldability of the fluorinated polymer (B11) and the flex resistance of the fiber-reinforced molded product will be excellent, preferred is at least one member selected from the group consisting of HFP, PAVE and FAE, and more preferred is either one or both of FAE and HFP.

As PAVE, $CF_2=CFOCF_2CF_3$, $CF_2=CFOCF_2CF_2CF_3$, $CF_2=CFOCF_2CF_2CF_2CF_3$, $CF_2=CFO(CF_2)_6F$, etc. may be mentioned, and $CF_2=CFOCF_2CF_2CF_3$ (hereinafter referred to also as "PPVE") is preferred.

As FAE, $CH_2=CF(CF_2)_2F$, $CH_2=CF(CF_2)_3F$, $CH_2=CF(CF_2F$, $CH_2=CF(CF_2)_5F$, $CH_2=CF(CF_2)_6F$, $CH_2=CF(CF_2)_2H$, $CH_2=CF(CF_2)_3H$, $CH_2=CF(CF_2H$, $CH_2=CF(CF_2)_5H$, $CH_2=CF(CF_2)_6H$, $CH_2=CH(CF_2)_2F$, $CH_2=CH(CF_2)_3F$, $CH_2=CH(CF_2F$, $CH_2=CH(CF_2)_5F$, $CH_2=CH(CF_2)_6F$, $CH_2=CH(CF_2)_2H$, $CH_2=CH(CF_2)_3H$, $CH_2=CH(CF_2)_4H$, $CH_2=CH(CF_2)_5H$, $CH_2=CH(CF_2)_6H$, etc. may be mentioned.

As FAE, preferred is $CH_2=CH(CF_2)_{q1}X^4$ (wherein q1 is from 2 to 6, preferably from 2 to 4), more preferred is $CH_2=CH(CF_2)_2F$, $CH_2=CH(CF_2)_3F$, $CH_2=CH(CF_2)_4F$, $CH_2=CF(CF_2)_3H$ or $CH_2=CF(CF_2)_4H$, and particularly preferred is $CH_2=CH(CF_2)_4F$ or $CH_2=CH(CF_2)_2F$.

Preferred proportions of the respective units in the fluorinated polymer (B11) are as follows.

The proportion of units (u1) is preferably from 90 to 99.89 mol %, more preferably from 95 to 99.47 mol %, further preferably from 96 to 98.95 mol %, to the total of units (u1), units (u2) and units (u3).

The proportion of units (u2) is preferably from 0.01 to 3 mol %, more preferably from 0.03 to 2 mol %, further preferably from 0.05 to 1 mol %, to the total of units (u1), units (u2) and units (u3).

The proportion of units (u3) is preferably from 0.1 to 9.99 mol %, more preferably from 0.5 to 9.97 mol %, further preferably from 1 to 9.95 mol %, to the total of units (u1), units (u2) and units (u3).

The fluorinated polymer (B11) may have units (u4) derived from a monomer having no fluorine (but excluding an acid anhydride group-containing cyclic hydrocarbon monomer) in addition to the units (u1) to (u3).

As the monomer having no fluorine, a compound having one polymerizable carbon-carbon double bond and having no fluorine is preferred, and, for example, an olefin (ethylene (hereinafter referred to also as "E"), propylene, 1-butene, etc.), a vinyl ester (vinyl acetate, etc.), etc. may be mentioned. As the monomer having no fluorine, one type may be used alone, or two or more types may be used in combination.

As the monomer having no fluorine, from such a viewpoint that mechanical properties, etc. of the fiber-reinforced molded product will be excellent, E, propylene or 1-butene is preferred, and E is particularly preferred.

In a case where units (u4) are derived from E, preferred proportions of the respective units are as follows.

The proportion of units (u1) is preferably from 25 to 80 mol %, more preferably from 40 to 65 mol %, further preferably from 45 to 63 mol %, to 100 mol % of the total of units (u1), units (u2), units (u3) and units (u4).

The proportion of units (u2) is preferably from 0.01 to 5 mol %, more preferably from 0.03 to 3 mol %, further preferably from 0.05 to 1 mol %, to 100 mol % of the total of units (u1), units (u2), units (u3) and units (u4).

The proportion of units (u3) is preferably from 0.2 to 20 mol %, more preferably from 0.5 to 15 mol %, further preferably from 1 to 12 mol %, to 100 mol % of the total of units (u1), units (u2), units (u3) and units (u4).

The proportion of units (u4) is preferably from 20 to 75 mol %, more preferably from 35 to 50 mol %, further preferably from 37 to 55 mol %, to 100 mol % of the total of units (u1), units (u2), units (u3) and units (u4).

When the proportions of the respective units are within the above ranges, the flame retardance, chemical resistance, etc. of the fiber-reinforced molded product will be remarkably excellent.

When the proportion of units (u2) is within the above range, the amount of acid anhydride groups in the fluorinated polymer (B11) becomes proper, whereby the impact resistance of the fiber-reinforced molded product will be remarkably excellent. When the proportion of units (u3) is within the above range, the moldability of the fluorinated polymer (B11) and the bending resistance, etc. of the fiber-reinforced molded product will be remarkably excellent. The proportions of the respective units can be calculated by the melt NMR analysis, fluorine content analysis, infrared absorption spectrum analysis, etc. of the fluorinated polymer (B11).

In the fluorinated polymer (B11), part of acid anhydride groups in units (u2) is hydrolyzed, and as a result, there may be a case where units derived from the dicarboxylic acid (itaconic acid, citraconic acid, 5-norbornene-2,3-dicarboxylic acid, maleic acid, etc.) corresponding to the anhydride group-containing cyclic hydrocarbon monomer, are contained. In a case where units derived from the dicarboxylic acid are contained, the proportion of such units shall be included in the proportion of units (u2).

Preferred examples of the fluorine-containing polymer (B11) may be a TFE/NAH/PPVE copolymer, a TFE/IAH/PPVE copolymer, a TFE/CAH/PPVE copolymer, a TFE/IAH/HFP copolymer, a TFE/CAH/HFP copolymer, a TFE/IAH/CH$_2$=CH(CF$_2$)$_4$F/E copolymer, a TFE/CAH/CH$_2$=CH(CF$_2$)$_4$F/E copolymer, a TFE/IAH/CH$_2$=CH(CF$_2$)$_2$F/E copolymer, a TFE/CAH/CH$_2$=CH(CF$_2$)$_2$F/E copolymer, a TFE/IAH/HFP/CH$_2$=CH(CF$_2$)$_4$F/E copolymer, etc.

The fluororesin (B) may be prepared by conventional methods. In a case where a fluororesin (B) is produced by polymerization of monomers, as the polymerization method, it is preferred to use a polymerization method using a radical polymerization initiator.

As the polymerization method, a bulk polymerization method, a solution polymerization method using an organic solvent (a fluorinated hydrocarbon, a chlorinated hydrocarbon, a fluorinated chlorinated hydrocarbon, an alcohol, a hydrocarbon, etc.), a suspension polymerization method using an aqueous medium and, as the case requires, an appropriate organic solvent, or an emulsion polymerization method using an aqueous medium and an emulsifier, may be mentioned, and a solution polymerization method is preferred.

Other components to be contained in the matrix resin may be an inorganic filler, an organic filler, an organic pigment, a metal soap, a surfactant, an ultraviolet absorber, a lubricant, a silane coupling agent, an organic compound (e.g. an organic monomer, inorganic oligomer with a polymerization degree of 50 or less, etc.), etc., and an inorganic filler is preferred.

In 100 mass % of the total of the thermoplastic resin (A) and the fluororesin (B), the proportion of the thermoplastic resin (A) is from more than 30 to 99 mass %, preferably from 40 to 97 mass %, more preferably from 55 to 95 mass %. When the proportion is at least the lower limit value in the above range, it will be easy to form a sea-island structure composed of a sea portion containing the thermoplastic resin (A) and island portions containing the fluororesin (B). When the proportion is at most the upper limit value in the above range, impact resistance of the fiber-reinforced molded product will be excellent.

In 100 mass % of the total of the thermoplastic resin (A) and the fluororesin (B), the proportion of the fluororesin (B) is from 1 to less than 70 mass %, preferably from 3 to 60 mass %, more preferably from 5 to 45 mass %. When the proportion is at least the lower limit value in the above range, impact resistance of the fiber-reinforced molded product will be excellent. When the proportion is at most the upper limit value in the above range, it will be easy to form a sea-island structure composed of a sea portion containing the thermoplastic resin (A) and island portions containing the fluororesin (B).

In 100 mass % of the matrix resin, the total proportion of the thermoplastic resin (A) and the fluororesin (B) is preferably from 80 to 100 mass %, more preferably from 85 to 100 mass %, further preferably from 9 to 100 mass %. When the proportion is within the above range, the effects of the present invention will be less likely to be impaired.

In a case where the matrix resin contains other components, in 100 mass % of the matrix resin, the total proportion of other components is preferably from more than 0 to 20 mass %, more preferably from more than 0 to 15 mass %, further preferably from more than 0 to 10 mass %. It is also preferred that no other components are contained. When the above proportion is within the above range, the effects of the present invention will be less likely to be impaired.

In the prepreg of the present invention, the matrix resin has an Izod impact strength as measured at −40° C. of preferably at least 60 J/m, more preferably at least 70 J/m, particularly preferably at least 100 J/m. By the use of the matrix resin, a fiber-reinforced molded product obtainable from the prepreg will have a high impact resistance. The matrix resin is preferably one containing the thermoplastic resin (A) and the fluororesin (B). Further, as the thermoplastic resin (A), the above-mentioned polyimide is particularly preferred, and as the fluororesin (B), the above-mentioned fluorinated polymer (B11) is preferred.

By the prepreg of the present invention, it is possible to obtain a fiber-reinforced molded product excellent in impact resistance, and the reason for exhibiting a remarkable effect such as excellent storage stability as compared with a thermosetting prepreg, is not necessarily clear, but is considered to be as follows.

The thermoplastic resin (A) and the functional groups (f) of the fluororesin (B) undergo a reaction or association, whereby it is considered that the impact resistance of the fiber-reinforced molded product will be excellent. Particularly, polar groups which the thermoplastic resin (A) has in the main chain and/or at the terminals, and functional groups (f) of the fluororesin (B), undergo a reaction or association, whereby it is possible to impart the toughness possessed by the fluororesin (B) to the thermoplastic resin (A), and the adhesion between the matrix resin thus formed, and the reinforcing fibers, will be improved, so that the impact resistance of the fiber-reinforced molded product will be excellent.

Further, the prepreg of the present invention is a thermoplastic prepreg comprising a thermoplastic resin (A) and a melt-moldable fluororesin (B) as the matrix resin, and thus, as compared with a thermosetting prepreg, it is superior in storage stability.

<Method for Producing Prepreg>

The prepreg of the present invention may be produced, for example, by letting at least a thermoplastic resin (A) and a fluororesin (B) be impregnated in a specific ratio into reinforcing fibers.

As embodiments for the production method of the prepreg of the present invention, for example, the following three embodiments may be mentioned.

Method (I): A method wherein a powder mixture obtained by mixing a powder (X) made of a resin material (α) containing a thermoplastic resin (A) and a powder (Y) made of a resin material (β) containing a fluororesin (B), in a specific ratio, is melted in the presence of a reinforcing fiber sheet to let the resin material (α) and the resin material (β) be impregnated into the reinforcing fiber sheet.

Method (II): A method wherein a powder (Z) made of a resin material (γ) containing a thermoplastic resin (A) and a fluororesin (B) in a specific ratio, is melted in the presence of a reinforcing fiber sheet, to let the resin material (γ) be impregnated into the reinforcing fiber sheet.

Method (III): A method wherein a resin film made of a resin material (γ) containing a thermoplastic resin (A) and a fluororesin (B) in a specific ratio, is melted in the presence of a reinforcing fiber sheet, to let a resin material (γ) be impregnated into the reinforcing fiber sheet.

(Method (I))

As a specific example of the method (I), a method may, for example, be mentioned wherein a laminate composed of n-layered (where n is an integer of at least 1) reinforcing fiber sheets and (n+1)-layered powder mixture layers, having the reinforcing fiber sheets and the powder mixture layers alternately laminated, is hot-pressed by a hot pressing machine, to let the powder mixture be melted and to let the resin material (α) and the resin material (β) be impregnated into the reinforcing fiber sheets.

The temperature at the time of the hot pressing is at least the melting point of the thermoplastic resin (A) and at least the melting point of the fluororesin (B), and is preferably at least the melting point +5° C. and at most the melting point +100° C. of whichever higher between the melting point of the thermoplastic resin (A) and the melting point of the fluororesin (B).

The pressure at the time of the hot pressing is preferably from 0.1 to 50 MPa, more preferably from 0.5 to 30 MPa. The time for the hot pressing is preferably at least 3 seconds and at most 180 minutes, more preferably at least 5 seconds and at most 60 minutes.

The powder mixture is a mixture of the powder (X) and the powder (Y). The powder mixture may contain powders other than the powder (X) and the powder (Y) within a range not to impair the effects of the present invention.

The powder mixture is prepared by mixing the powder (X) and the powder (Y), so that the proportion of the thermoplastic resin (A) and the proportion of the fluororesin (B) would be in the above-mentioned specific proportions in the matrix resin.

The powder (X) is made of a resin material (α) containing the thermoplastic resin (A).

The resin material (α) may contain components other than the thermoplastic resin (A) within a range not impair the effects of the present invention.

The proportion of the thermoplastic resin (A) in 100 mass % of the resin material (α), is preferably from 80 to 100 mass %, more preferably from 85 to 100 mass %, further preferably from 90 to 100 mass %. When the proportion is within the above range, the effects of the present invention will be less likely to be impaired.

In a case where the resin material (α) contains other components, in 100 mass % of the resin material (α), the total proportion of other components is preferably from more than 0 to 20 mass %, more preferably from more than 0 to 15 mass %, further preferably from more than 0 to 10 mass %. It is also preferred that the resin material (α) does not contain other components. When the above proportion is within the above range, the effects of the present invention will be less likely to be impaired.

The average particle diameter of the powder (X) is preferably from 0.02 to 200 μm, more preferably from 1 to 100 μm. When the average particle diameter is at least the lower limit value in the above range, work handling efficiency of the powder will be excellent. When the average particle diameter is at most the upper limit value in the above range, it will be easy to let the resin material (a) be impregnated in the reinforcing fiber sheet.

The powder (X) may be produced, for example, by the following procedure.

The thermoplastic resin (A) and, as the case requires, other components are melt-kneaded. A melt of the resin material (a) is extruded in the form of strands. The strands are cut and pelletized by a pelletizer. The pellets are mechanically pulverized. The pulverized product is classified to obtain a powder (X).

As an apparatus capable of mechanically pulverizing the pellets, a hammer mill, a pin mill, a disk mill, a rotary mill, a jet mill, a fluidized bed air jet mill, a jaw crusher, a gyratory crusher, a cage mill, a pan crusher, a ball mill, a pebble mill, a rod mill, a tube mill, a disk attrition mill, an attritor, a disk refiner, etc. may be mentioned.

Pulverization of pellets is preferably carried out by cooling the pellets to a temperature of at most −40° C., from such a viewpoint that it is thereby easy to reduce the average particle diameter of the pulverized product. The cooling temperature is more preferably at most −100° C., further preferably at most −160° C. The cooling method may be a method of using dry ice or liquid nitrogen.

The powder (Y) is made of a resin material (β) containing a fluororesin (B). The resin material (β) may contain components other than the fluororesin (B) within a range not impair the effects of the present invention.

In 100 mass % of the resin material (β), the proportion of the fluororesin (B) is preferably from 80 to 100 mass %, more preferably from 85 to 100 mass %, further preferably from 90 to 100 mass %. When the proportion is within the above range, the effects of the present invention is less likely to be impaired.

In a case where the resin material (β) contains other components, in 100 mass % of the resin material (β), the total proportion of other components is preferably from more than 0 to 20 mass %, more preferably from more than 0 to 15 mass %, further preferably from more than 0 to 10 mass %. It is also preferred that the resin material (β) does not contain other components. When the total proportion of other components is within the above range, the effects of the present invention will be less likely to be impaired.

The average particle diameter of the powder (Y) is preferably from 0.02 to 200 μm, more preferably from 1 to 100 μm. When the average particle diameter is at least the lower limit value in the above range, work handling efficiency of the powder will be excellent. When the average particle diameter is at most the upper limit value in the above range, it will be easy to let the resin material (β) be impregnated in the reinforcing fiber sheet. Further, when the average particle diameter is within the above range, it is possible to make the average diameter of island portions of the matrix resin to be within the above-mentioned preferred range.

The powder (Y) may be produced, for example, by the same procedure as the above-described procedure to produce the powder (X).

(Method (II))

As a specific example of the method (II), a method may, for example, be mentioned wherein a laminate composed of n-layered (where n is an integer of at least 1) reinforcing fiber sheets and (n+1)-layered powder (Z) layers, having the reinforcing fiber sheets and the powder (Z) layers alternately laminated, is hot-pressed by a hot pressing machine, to let the powder (Z) be melted and to let the resin material (γ) be impregnated into the reinforcing fiber sheets.

The temperature, pressure and time for the hot pressing are the same as in the method (I).

The powder (Z) is made of a resin material (γ) containing a thermoplastic resin (A) and a fluororesin (B). The resin material (γ) may contain components other than the thermoplastic resin (A) and the fluororesin (B) within a range not impair the effects of the present invention.

In 100 mass % of the total of the thermoplastic resin (A) and the fluororesin (B) in the resin material (γ), the ranges of the proportion of the thermoplastic resin (A) and the proportion of the fluororesin (B) are the same as the above-mentioned specific ranges in the matrix resin.

In 100 mass % of the resin material (γ), the ranges of the proportion of the thermoplastic resin (A), the proportion of the fluororesin (B) and the total proportion of other components are the same as the above-mentioned specific ranges in the matrix resin.

The average diameter of island portions containing the fluororesin (B) in the resin material (γ) prior to being impregnated into the reinforcing fiber sheet is preferably from 0.01 to 8 μm and less than the average particle diameter of the powder (Z), more preferably from 0.01 to 5 μm and less than the average particle diameter of the powder (Z). When the above average diameter is within the above range, it is possible to make the average diameter of island portions of the matrix resin to be within the above-mentioned preferred range.

The average particle diameter of the powder (Z) is preferably from 0.02 to 200 μm, more preferably from 1 to 100 μm. When the average particle diameter is at least the lower limit value in the above range, work handling efficiency of the powder will be excellent. When the average particle diameter is at most the upper limit value in the above range, it is easy to let the resin material (γ) be impregnated in the reinforcing fiber sheet.

The powder (Z) may be produced, for example, by the same procedure as the above-described procedure to produce the powder (X).

When letting the powder be impregnated into the reinforcing fiber sheets as in the method (I) and the method (II), it is also possible to use a PIF (Powder Impregnated Fabric) method. By using this technique, it is possible to complete the impregnation in a short time. Further, even a resin having a very high melt viscosity may be sufficiently impregnated by using the PIF method. For the PIF method, reference may be made to p. 138 to 168 of "Molding and properties of continuous fibers FRTP" (Editor: Ben Goichi, published by Nikkan Kogyo Shinbun).

(Method (III))

As a specific example of the method (III), a method may, for example, be mentioned wherein a laminate composed of n-layered (where n is an integer of at least 1) reinforcing fiber sheets and (n+1)-layered resin films, having the reinforcing fiber sheets and the resin films alternately laminated, is hot-pressed by a hot pressing machine, to let the resin films be melted and to let the resin material (γ) be impregnated into the reinforcing fiber sheets. The temperature, pressure and time for the hot pressing are the same as in the method (I).

The resin film is made of a resin material (γ) containing a thermoplastic resin (A) and the fluororesin (B). As the resin material (γ), the same one as the resin material (γ) in the powder (Z) may be mentioned, and the preferred form is also the same. Further, the average diameter of island portions containing the fluororesin (B) in the resin material (γ) prior to being impregnated into the reinforcing fiber sheet is preferably less than the thickness of the resin film.

The resin film may, for example, be produced by melt-kneading the thermoplastic resin (A), the fluororesin (B) and, as the case requires, other components, and extruding a melt of the resin material (γ) from a T-die in a film form.

<Fiber-Reinforced Molded Product>

The fiber-reinforced molded product of the present invention is one formed by using the prepreg of the present invention. The fiber-reinforced molded product of the present invention may be one formed by using only the prepreg of the present invention, or may be a laminate formed by using the prepreg of the present invention and another prepreg other than the prepreg of the present invention, or may be a laminate formed by using the prepreg of the present invention and, as the case requires, another prepreg, as well as another member other than the prepregs.

Another prepreg may, for example, be a prepreg wherein the matrix resin contains only a thermoplastic resin (A) and does not contain a fluororesin (B), or a prepreg wherein the matrix resin contains a fluororesin (B) and does not contain a thermoplastic resin (A).

Another member other than the prepregs may, for example, be a metal member; a resin film containing a thermoplastic resin (A); or a resin film containing a fluorine resin (B).

The metal member may, for example, be a metal foil, various metal parts, etc. The metal may, for example, be iron, stainless steel, aluminum, copper, brass, nickel, zinc, etc. The shape of the metal member is not particularly limited, and may be suitably selected depending upon the fiber-reinforced molded product to be obtained.

(Method for Producing Fiber-Reinforced Molded Product)

The fiber-reinforced molded product of the present invention may be obtained, for example, by molding, while heating, only one prepreg of the present invention, a laminate having at least two prepregs of the present invention stacked, or a laminate having at least one prepreg of the present invention, another prepreg and a member other than the prepregs stacked. As the molding method, a press molding method using a mold, etc. may be mentioned.

(Applications)

As applications of the fiber-reinforced molded product, the following ones may be mentioned.

Housings for electrical and electronic equipment (personal computers, displays, OA equipment, mobile phones, personal digital assistants, facsimiles, compact discs, portable MD, portable radio cassettes, PDA (portable information terminals such as electronic organizers), video cameras, digital still cameras, optical device, audio, air-conditioning, lighting, entertainment goods, toys goods, other household appliances, etc.), inner members (trays, chassis, etc.), cases for inner members, mechanical parts, etc. Building materials (panels), etc.

Automobile, motorcycle related parts, members and outer plates: motor parts, alternator terminals, alternator connectors, IC regulators, potentiometer for light deer base, suspension parts, various valves (exhaust gas valves, etc.), fuel-related, exhaust system or intake system various pipes, air intake nozzle snorkels, intake manifolds, various arms, various frames, various hinges, various bearings, fuel pumps, gasoline tanks, CNG tanks, engine cooling water joints, carburetor main body, carburetor spacers, exhaust gas sensors, coolant sensors, oil temperature sensors, brake pad wear sensors, throttle position sensors, crankshaft position sensors, air flow meters, brake pad wear sensors, air conditioning thermostat base, heating warm air flow control valves, brush holders for radiator motors, water pump impellers, turbine vanes, wiper motor-related parts, distributors, starter switches, starter relays, transmission wire harnesses, window washer nozzles, air conditioner panel switch boards, coils for fuel-related magnetic valves, fuse connectors, battery trays, AT brackets, head lamp supports, pedal housings, steering wheels, door beams, protectors, chassis, frames, arm rests, horn terminals, step motor rotors, lamp sockets, lamp reflectors, lamp housings, brake pistons, noise shield, radiator supports, spare tire covers, seat shells, solenoid bobbins, engine oil filters, ignition device cases, under covers, scuff plates, pillar trim, propeller shafts, wheels, fenders, fascia, bumpers, bumper beams, hoods, aero parts, platforms, cowl louvers, roofs, instrument panels, spoilers, various modules, etc.

Aircraft-related parts, members and outer plates: landing gear pods, winglets, spoilers, edges, ladders, elevators, failing, ribs, etc. Other: blades of wind turbines, etc.

The fiber-reinforced molded product is preferably used particularly for aircraft components, windmill blades, automobile outer plates, and housings, trays, chassis, etc. of electronic devices. Further, the fiber-reinforced composite material is preferably used particularly also for a housing of a battery pack.

Further, the matrix resin in the present invention may also be suitably used as a resin composition with short fibers. As the short fibers, glass fibers, carbon fibers, etc. may be mentioned, and among them, carbon fibers are preferred.

Further, a polyamide resin composition is sometimes used for an adhesive or skin yarn monofilaments to be used for sports racquet related goods such as tennis rackets or badminton rackets and their guts (see JP-A-2013-99412). By using the matrix resin of the present invention as a component of such an adhesive or skin yarn monofilaments, improvement in toughness can be expected as compared with the case of using the polyamide resin alone.

Further, also as a shuttle member for badminton, improvement in toughness can be expected by using the matrix resin of present invention, especially the polyamide resin composition, as compared with the case of using the polyamide resin alone.

EXAMPLES

In the following, the present invention will be specifically described with reference to Examples, but the present invention is by no means construed as being limited thereto. Ex. 1, 3-1 to 3-10, 5-1 to 5-3, and 7-1 to 7-2 are Examples of the present invention, and Ex. 2, 4-1 to 4-8, 6-1 to 6-3, and 8 are Comparative Examples.

(Content of Functional Groups (f))

By the following infrared absorption spectrum analysis, the proportion of units derived from IAH having a functional group (f) in the fluororesin (B), was obtained.

The fluororesin (B) was press-molded to obtain a 200 μm film. In the infrared absorption spectrum, the absorption peak in the units derived from IAH in the fluororesin (B) appears at 1,778 cm$^{-1}$. By measuring the absorbance of the absorption peak, and using a molar absorption coefficient of 20,810 mol$^{-1}$·cm$^{-1}$ of IAH, the proportion (mol %) of units derived from IAH was obtained.

When the above proportion is taken as a (mol %), the number of functional groups (f) (acid anhydride groups) to $1 \times 10^6$ carbon atoms in the main chain, is calculated as [$a \times 10^6/100$].

(Melting Point)

Using a differential scanning calorimeter (DSC apparatus, manufactured by Seiko Instruments Inc.), the melting peak at the time when the polymer was heated at a rate of 10° C./min. was recorded, whereby the temperature (° C.) corresponding to the maximum value was taken as the melting point.

(Melt Flow Rate)

Using a melt indexer (manufactured by Techno Seven Co.), the mass (g) of the polymer flowing out for 10 minutes from a nozzle having a diameter of 2 mm and a length of 8 mm under conditions of 297° C. and a load 49N, was measured.

(Average Diameter of Island Portions)

An object to be measured was frozen in liquid nitrogen and cut. The cut surface was observed by a scanning electron microscope (manufactured by Hitachi High-Technologies Corporation, FE-SEM). The circle equivalent diameters of five island portions were, at a magnification of 3,000 times, calculated using the length measurement function included in FE-SEM, and the average value thereof was obtained. Further, the island portions were confirmed to be a fluororesin (B) by the elemental analysis using an energy dispersive X-ray analyzer (EDX).

(Izod Impact Strength)

With respect to Ex. 1, Ex. 2, Ex. 5-1 to Ex. 5-3, Ex. 6-1 to Ex. 6-3

Using a contour machine (manufactured by Amada Machine Tools Co., Ltd., V-400), the prepreg was cut to obtain a sample with a height: 63 mm, a width: 13 mm and a thickness: 2.8 mm. A notch was imparted at a height of 32 mm in the sample to obtain a test specimen.

With respect to the test specimen, using an Izod testing apparatus (manufactured by Toyo Seiki Co.), the Izod impact strength was measured under conditions of a hammer capacity: 2.75 J, a hammer weight: 13.97N, a distance from the axial center to the center of gravity: 10.54 cm, and a distance from the axial center to the hitting point: 33.5 cm.

With respect to Ex. 3-1 to 10, and Ex. 4-1 to 8

Using an injection molding machine (manufactured by FUNUC Co., FUNUC 30A) the resin material was injection-molded at a molding temperature: 230 to 410° C., to obtain a molded product with a length: 127 mm, a width: 12.7 mm, and a thickness: 3.0 mm. Thereafter, the molded product was cut by using a contour machine (manufactured by Amada Machine Tools Co., Ltd., V-400) in a shape with a length: 60 mm, a width: 12.7 mm, and a thickness: 3 mm, and a notch was imparted to have a width of 10 mm at the center portion in the length direction to prepare a test specimen.

With respect to the test specimen, using an Izod testing apparatus (manufactured by Toyo Seiki Seisaku-sho, Ltd.), the Izod impact strength was measured under conditions of a hammer weight: 14.78N, a distance from the axial center to the center of gravity: 11.66 cm, a distance from the axial center to the hitting point: 35.7 cm, and an ambient temperature: room temperature or −40° C.

(Thermoplastic Resin (A))

Thermoplastic resin (A-1): Polyamide 6 (manufactured by Ube Industries, Ltd., UBE Nylon 1024B).

Thermoplastic resin (A-2): A polyether ether ketone (manufactured by Victrex Co., 150P).

Thermoplastic resin (A-3): A thermoplastic polyimide (AURUM (product name of Mitsui Chemicals, Inc.), PD500).

Thermoplastic resin (A-4): A polyether imide (Ultem (trade name of SABIC), 1,000).

Thermoplastic resin (A-5): A polyether sulfone (Veradel (trade name of Solvay Advanced Polymers), 3000P)

Thermoplastic resin (A-6): Polyamide 12 (manufactured by Ube Industries, Ltd., UBE nylon 3030U).

(Fluororesin (B))

Fluororesin (B-1): A fluororesin having functional groups (f) (manufactured by Asahi Glass Company, Limited, type of functional groups (f): carbonyl group-containing groups, content of functional groups (f): 3,000 groups to $1 \times 10^6$ carbon atoms in the main chain of the fluororesin (B-1), melting point: 245° C., melt flow rate (297° C., load 49N): 22 g/10 min.). The resin was produced in the same manner as in Example 1 of WO2015/182702, and the molar ratio of TFE/IAH/CH$_2$=CH(CF$_2$)$_2$F/E was 58.5/0.1/2.4/39.

Fluororesin (B-2): A fluororesin having functional groups (f) (manufactured by Asahi Glass Company, Limited, type of functional groups (f): carbonyl group-containing groups, content of functional groups (f): 1,000 groups to $1 \times 10^6$ carbon atoms in the main chain of the fluororesin (B-1), melting point: 300° C., melt flow rate (372° C., load 49N): 22 g/10 min.). The resin was produced in the same manner as in Example 5 of WO2015/182702, and the molar ratio of TFE/NAH/PPVE was 97.9/0.1/2.

Fluororesin (B-3): A fluororesin having functional groups (f) (manufactured by Asahi Glass Company, Limited, type of functional groups (f): carbonyl group-containing groups, content of functional groups (f): 3,000 groups to $1 \times 10^6$ carbon atoms in the main chain of the fluororesin (B-1), melting point: 180° C., melt flow rate (250° C., load 21.2 N): 4.4 g/10 min.). The resin was produced in the same manner as in Example 3 of WO2015/182702, and the molar ratio of TFE/IAH/HFP/CH$_2$=CH(CF$_2$)$_4$F/E was 47.5/0.3/8.3/0.6/43.4.

Fluororesin (B-4): A fluororesin having no functional group (f) (manufactured by Asahi Glass Company, Limited, FLUON (trademark) ETFE LM-730AP, melt flow rate (250° C., load 21.2 N): 2.8 g/10 min.).

(Ex. 1)

The thermoplastic resin (A-1) and the fluororesin (B-1) were dry-blended at a ratio shown in Table 1, then charged into a biaxial extruder (manufactured by TECHNOVEL Corp., KZW15TW-45MG), and melt-kneaded under conditions of a resin discharge amount: 2.0 kg/hr, a screw rotational speed: 200 rpm, and a set resin temperature: 280° C., to obtain a resin material (γ-1). The average diameter of island portions containing the fluororesin (B-1) in the resin material (γ-1) is shown in Table 1.

With respect to the resin material (γ-1), using a single-screw extruder (manufactured by Tanabe Plastics Machinery Co., Ltd., VS-30) and a T-die with a width of 150 mm, a resin film having a thickness of 100 μm was prepared at a set resin temperature: 280° C. and a line speed: 0.5 m/min.

A carbon cloth (manufactured by Sunlight Inc., plain weave CF3000, thickness: 0.25 mm) and the resin film were cut in a size of 10 cm×10 cm. The resin film and the carbon cloth were alternately laminated to obtain a laminate composed of 5-layers of the carbon cloth and 6-layers of the resin film. Using a melt hot pressing machine (manufactured by Tester Sangyo Co., Ltd.), the laminate was press-molded under conditions of a temperature: 280° C., a preheating time: 10 minutes, a pressure: 10 MPa (absolute pressure), and a pressing time: 3 minutes, to obtain a prepreg having a thickness of 2.8 mm. The average diameter of island portions in the prepreg and the Izod impact strength are shown in Table 1.

(Ex. 2)

With respect to the thermoplastic resin (A-1), a resin film having a thickness of 100 μm was prepared in the same manner as in Ex. 1. Except that the resin film of Ex. 1 was changed to the resin film of Ex. 2, a prepreg was obtained in the same manner as in Ex. 1. The Izod impact strength is shown in Table 1.

TABLE 1

|  |  | Ex. 1 | Ex. 2 |
| --- | --- | --- | --- |
| Thermoplastic resin (A-1) | mass % | 72 | 100 |
|  | vol % | 80 | 100 |
| Fluororesin (B-1) | mass % | 28 | — |
|  | vol % | 20 | — |
| Resin material (γ) |  | (γ-1) | — |
| Average diameter of island portions in rein material (γ) [μm] |  | 0.15 | — |
| Average diameter of island portions in prepreg [μm] |  | 0.15 | — |
| Izod impact strength (notched) [J/m] |  | 787 | 682 |

Ex. 1 containing the fluororesin (B) in the matrix resin was superior in impact resistance as compared to Ex. 2 containing no fluororesin (B) in the matrix resin.

(Ex. 3-1)

The thermoplastic resin (A-2) and the fluororesin (B-2) were dry-blended at a ratio shown in Table 2, then put into a biaxial extruder (manufactured by TECHNOVEL Corp., KZW15TW-45MG), and melt-kneaded under conditions of a resin discharge rate: 2.0 kg/hr, a screw rotational speed: 200 rpm, and a set resin temperature: 380° C., to obtain a resin material. The Izod impact strength is shown in Table 2.

(Ex. 3-2 to 10, Ex. 4-1, 2, 4, 6 to 8)

In Ex. 3-2 to 10, and Ex. 4-1, 2, 4, 6 to 8, a resin material was prepared in the same manner as in Ex. 3-1, except that the types, volume ratio, mass ratio and kneading conditions of the thermoplastic resin (A) and the fluororesin (B) were respectively changed to ones shown in Table 2. The Izod impact strength is shown in Table 2.

(Ex. 4-3, 5)

In Ex. 4-3, 5, without melt-kneading, pellets were used as they were, and injection-molded to prepare a test specimen for an Izod impact test by a Contour machine. The Izod impact strength is shown in Table 2.

TABLE 2

| Test Ex. | Matrix resin Thermoplastic resin (A) | Matrix resin Fluororesin (B) | Volume ratio (vol %) Thermoplastic resin (A) | Volume ratio (vol %) Fluororesin (B) | Mass ratio (mass %) Thermoplastic resin (A) | Mass ratio (mass %) Fluororesin (B) | Kneading conditions Set resin temperature (°C.) | Kneading conditions Screw rotational speed (rpm) | Izod impact strength (J/m) Room temperature (23°C.) | Izod impact strength (J/m) Low temperature (−40°C.) |
|---|---|---|---|---|---|---|---|---|---|---|
| Ex. 3-1 | (A-2) | (B-2) | 80 | 20 | 71 | 29 | 380 | 200 | 54 | 94 |
| Ex. 3-2 | (A-3) | (B-2) | 90 | 10 | 85 | 15 | 410 | 400 | 395 | 135 |
| Ex. 3-3 | (A-3) | (B-2) | 80 | 20 | 71 | 29 | 410 | 400 | 286 | 134 |
| Ex. 3-4 | (A-4) | (B-2) | 90 | 10 | 84 | 16 | 360 | 200 | 80 | 65 |
| Ex. 3-5 | (A-4) | (B-2) | 80 | 20 | 70 | 30 | 360 | 200 | 76 | 76 |
| Ex. 3-6 | (A-4) | (B-2) | 70 | 30 | 58 | 42 | 360 | 200 | 80 | 69 |
| Ex. 3-7 | (A-5) | (B-2) | 70 | 30 | 60 | 40 | 340 | 200 | 54 | 50 |
| Ex. 3-8 | (A-6) | (B-3) | 90 | 10 | 84 | 16 | 240 | 200 | 192 | 78 |
| Ex. 3-9 | (A-6) | (B-3) | 80 | 20 | 70 | 30 | 240 | 200 | 291 | 109 |
| Ex. 3-10 | (A-6) | (B-3) | 70 | 30 | 58 | 42 | 240 | 200 | 408 | 119 |
| Ex. 4-1 | (A-2) | — | 100 | 0 | 100 | 0 | 380 | 200 | 32 | 11 |
| Ex. 4-2 | (A-3) | — | 100 | 0 | 100 | 0 | 410 | 400 | 38 | 33 |
| Ex. 4-3 | (A-4) | — | 100 | 0 | 100 | 0 | — | — | 29 | 34 |
| Ex. 4-4 | (A-5) | — | 100 | 0 | 100 | 0 | 340 | 200 | 48 | 30 |
| Ex. 4-5 | (A-6) | — | 100 | 0 | 100 | 0 | — | — | 111 | 45 |
| Ex. 4-6 | (A-6) | (B-4) | 90 | 10 | 84 | 16 | 240 | 200 | 98 | 58 |
| Ex. 4-7 | (A-6) | (B-4) | 80 | 20 | 70 | 30 | 240 | 200 | 58 | 38 |
| Ex. 4-8 | (A-6) | (B-4) | 70 | 30 | 57 | 43 | 240 | 200 | 68 | 40 |

As is evident from Table 2, the test specimen using the matrix resin in the present invention was excellent in impact resistance not only at room temperature but also at the low temperature.

(Ex. 5-1)

The thermoplastic resin (A-3) and the fluororesin (B-2) were dry-blended at a ratio shown in Table 3-1, then put into a biaxial extruder (manufactured by TECHNOVEL Corp., KZW15TW-45MG) and melt-kneaded under conditions of a resin discharge rate: 2 kg/time, a screw rotational speed: 400 rpm, and a set die temperature: 395° C., to obtain a resin material (γ). The resin material was pulverized by a refrigerating pulverizer TPH-01 manufactured by AS ONE Corporation, to produce a powder (Z) made of the resin material (γ).

On the other hand, a carbon cloth (manufactured by Sunlight Inc., plain weave CF3000, thickness: 0.25 mm) was cut in a size of 10 cm×10 cm. Then, to the surface of the carbon cloth, the powder (Z) was uniformly applied by coating treatment by electrostatic coating so that the carbon fiber content would be Vf=50%. Thereafter, in the hot air circulating drying machine, thermal exposure was conducted at 420° C. for 3 minutes to obtain a prepreg having the powder (Z) impregnated therein. Here, the above Vf was calculated by the following formula.

$$Vf(\%) = (\text{volume of carbon cloth}/(\text{volume of carbon cloth} + \text{volume of coated powder (Z)})) \times 100$$

10 sheets of the obtained prepreg were laminated to obtain a laminate. Using a melt hot pressing machine (manufactured by Tester Sangyo Co., Ltd.), the laminate was press-molded under condition of a temperature: 410° C., a pressure: 10 MPa (gauge pressure?), and a pressing time: 15 minutes (preheating process: 12 minutes (without pressurization), compression step: 3 minutes), to obtain a laminate (fiber-reinforced molded product) having a thickness of 2.3 mm (±0.05). The Izod impact strength of the obtained laminate is shown in Table 3-1.

(Ex. 5-2 to 5-3, Ex. 6-1 to 6-3)

A resin material, a powder, a prepreg and a laminate were obtained in the same manner as in Ex. 5-1 except that the conditions for melt kneading by the biaxial extruder were changed as shown in Table 3-2, the heat exposure conditions (drying temperature, drying time) at the time of preparation of a prepreg were changed as shown in Table 3-3, and the pressing conditions were changed as shown in Table 3-4. The Izod impact strength of the obtained laminate is shown in Table 3-1.

TABLE 3-1

|  | Ex. 5-1 | Ex. 5-2 | Ex. 5-3 | Ex. 6-1 | Ex. 6-2 | Ex. 6-3 |
|---|---|---|---|---|---|---|
| Thermoplastic resin (A) | A-3 | A-1 | A-6 | A-3 | A-1 | A-6 |
| Fluororesin (B) | B-2 | B-1 | B-3 | — | — | — |
| Mass ratio of (A)/(B) | 80/20 | 80/20 | 80/20 | — | — | — |
| Average particle diameter of powder (Z) (resin material γ powder) | 119 | 161 | 173 | 25 | 107 | 121 |
| Average particle diameter (μm) of island portions in γ | 1.5 | 0.1 | <0.1 | — | — | — |
| Average particle diameter (μm) of island portions in matrix resin impregnated in prepreg | 2.5 | 0.08 | <0.1 (As the diameter was so small that observation was impossible) | — | — | — |
| Izod impact strength (J/m) | 469 | 547 | 646 | 273 | 480 | 541 |

TABLE 3-2

|  | Set discharge amount (kg/hr) | Rotational speed (rpm) | Set resin temperature (°C.) |
|---|---|---|---|
| Ex. 5-2 | 2 | 200 | 280 |
| Ex. 5-3 | 2 | 200 | 260 |
| Ex. 6-1 | 2 | 400 | 395 |
| Ex. 6-2 | 2 | 200 | 280 |
| Ex. 6-3 | 2 | 200 | 260 |

TABLE 3-3

|  | Drying temperature (° C.) | Drying time (min) |
|---|---|---|
| Ex. 5-2 | 260 | 3 |
| Ex. 5-3 | 240 | 3 |
| Ex. 6-1 | 420 | 3 |
| Ex. 6-2 | 260 | 3 |
| Ex. 6-3 | 240 | 3 |

TABLE 3-4

|  | Pressing temperature (° C.) | Pressing time (min) | Pressing pressure (MPa) |
|---|---|---|---|
| Ex. 5-1 | 410 | 15 | 10 |
| Ex. 5-2 | 280 | 15 | 10 |
| Ex. 5-3 | 260 | 15 | 10 |
| Ex. 6-1 | 410 | 15 | 10 |
| Ex. 6-2 | 280 | 15 | 10 |
| Ex. 6-3 | 260 | 15 | 10 |

(Ex. 7-1)

The following powder of (X) and powder (Y) were mixed uniformly at a ratio shown in Table 4, to obtain a powder mixture.

Powder (X): manufactured by Arkema Inc., Oragasol 1002DNAT1. A powder made of polyamide 6 having an average particle diameter of 25 μm.

Powder (Y): a powder having an average particle diameter of 57 μm obtained by pulverizing the fluororesin (B-1) by a refrigerating pulverizer TPH-01 manufactured by AS ONE Corporation.

The powder mixture was uniformly applied to a plain weave carbon fiber roll (manufactured by Sakai Ovex Co., Ltd., open plain woven SA-31021) by coating treatment by electrostatic coating, to prepare a prepreg.

From the obtained prepreg, a substrate to be a test specimen for an impact test was cut out in a size of 212×250 mm, and 29 sheets of this substrate were laminated and subjected to press-molding. Then, from the obtained laminate, a test specimen was cut out in a predetermined size. Here, the press molding was conducted at a temperature of from 240 to 260° C. under a pressing pressure of 5 MPa for a pressing time of 5 minutes.

With respect to the test specimen, a test was conducted by a method in accordance with JIS K7077, and the Sharpy impact strength was measured at a lifting angle of 150° C. and at a support base distance of 60 mm.

As the test specimen, one adjusted to have a size of 80(±1)×10(±2)×2(±0.2) mm was used. The test was conducted 10 times (n=10), and the Sharpy impact strength was calculated by the average value thereof. The results are shown in Table 4.

(Ex. 7-2, Ex. 8-1)

A powder mixture, a prepreg and a laminate were obtained in the same manner as in Ex. 7-1 except that the mass ratio of the powder (X) and the powder (Y) was changed as shown in Table 4. The Charpy impact strength of each laminate obtained is shown in Table 3-1. In Ex. 8-1, the fluororesin powder (Y) was not used.

TABLE 4

|  | Ex. 7-1 | Ex. 7-2 | Ex. 8-1 |
|---|---|---|---|
| Thermoplastic resin powder (X) | A-1 | A-1 | A-1 |
| Fluororesin powder (Y) | B-1 | B-1 | — |
| Powder mixture |  |  |  |
| Mass ratio of (X)/(Y) | 80/20 | 50/50 | 100/0 |
| Average particle diameter of (X) | 25 | 25 | 25 |
| Average particle diameter of (Y) | 57 | 57 | — |
| Average particle diameter (μm) of island portions in prepreg | <0.5 | <0.5 | — |
| Sharpy impact strength (KJ/m$^2$) | 108 | 104 | 89 |

INDUSTRIAL APPLICABILITY

The fiber-reinforced molded product of the present invention is useful as a member constituting transport equipment (vehicles (automobiles, railway vehicles, etc.), aircrafts, etc.), construction, electrical and electronic equipment, etc.

This application is a continuation of PCT Application No. PCT/JP2017/000852, filed on Jan. 12, 2017, which is based upon and claims the benefit of priority from Japanese Patent Application No. 2016-4491 filed on Jan. 13, 2016 and Japanese Patent Application No. 2016-82787 filed on Apr. 18, 2016. The contents of those applications are incorporated herein by reference in their entireties.

What is claimed is:

1. A prepreg comprising reinforcing fibers and a matrix resin, wherein the matrix resin comprises a thermoplastic resin (but excluding the following fluororesin) and a melt-moldable fluororesin having functional groups of at least one type selected from the group consisting of carbonyl group-containing groups, hydroxy groups, epoxy groups and isocyanate groups, wherein the matrix resin has a sea-island structure composed of a sea portion containing the thermoplastic resin and island portions containing the fluororesin, wherein the average diameter of the island portions is from 0.01 to 200 μm, and in 100 mass % of the total of the thermoplastic resin and the fluororesin, the proportion of the thermoplastic resin is from more than 30 to 99 mass % and the proportion of the fluororesin is from 1 to less than 70 mass %.

2. The prepreg according to claim 1, wherein the melting point of the melt-moldable fluororesin is from 100 to 325° C.

3. The prepreg according to claim 2, wherein the melting point of the fluororesin is from 100 to less than 260° C.

4. A fiber-reinforced molded product using the prepreg as defined in claim 2.

5. The prepreg according to claim 1, wherein the matrix resin has an Izod impact strength measured at −40° C. of at least 60 J/m.

6. A fiber-reinforced molded product using the prepreg as defined in claim 5.

7. A fiber-reinforced molded product using the prepreg as defined in claim 1.

* * * * *